US008887123B2

(12) United States Patent
Lin et al.

(10) Patent No.: US 8,887,123 B2
(45) Date of Patent: Nov. 11, 2014

(54) FRAMEWORK FOR MANAGING COMPLEX OPERATIONS

(75) Inventors: Tao Lin, Palo Alto, CA (US);
Ming-Chien Shan, Saratoga, CA (US);
Suresh Babu, Los Altos, CA (US);
Chuan Li, Sunnyvale, CA (US)

(73) Assignee: SAP SE, Walldorf (DE)

( * ) Notice: Subject to any disclaimer, the term of this patent is extended or adjusted under 35 U.S.C. 154(b) by 1275 days.

(21) Appl. No.: 12/182,199

(22) Filed: Jul. 30, 2008

(65) Prior Publication Data
US 2009/0144694 A1 Jun. 4, 2009

Related U.S. Application Data

(60) Provisional application No. 60/991,489, filed on Nov. 30, 2007.

(51) Int. Cl.
*G06F 9/44* (2006.01)
*G06Q 10/06* (2012.01)

(52) U.S. Cl.
CPC ..................................... *G06Q 10/06* (2013.01)
USPC .......................... 717/102; 717/172; 705/7.39

(58) Field of Classification Search
CPC ....................................................... G06Q 10/06
USPC ......................................................... 717/172
See application file for complete search history.

(56) References Cited

U.S. PATENT DOCUMENTS

| | | | |
|---|---|---|---|
| 8,275,863 B2 * | 9/2012 | Selgas et al. ................... | 709/221 |
| 2001/0052108 A1 * | 12/2001 | Bowman-Amuah ............... | 717/1 |
| 2004/0103396 A1 * | 5/2004 | Nehab ........................... | 717/127 |
| 2005/0091093 A1 * | 4/2005 | Bhaskaran et al. ............... | 705/7 |
| 2006/0053039 A1 * | 3/2006 | Gamarnik et al. ................ | 705/7 |
| 2006/0155562 A1 * | 7/2006 | Kano et al. ........................ | 705/1 |
| 2008/0040704 A1 * | 2/2008 | Khodabandehloo et al. . | 717/105 |

OTHER PUBLICATIONS

Lin,T., et al., "Exploration of Data from Modeling and Simulation Through Visualization," Proceedings of International SimTecT Conference, 1998, pp. 303-308.*
Nagappan and Lin, "A Virtual Environment for Exploring Relational Information," *Proceedings of SimTecT '99*, Melbourne, Australia, 1999, 6 pgs.
Lin, "The Visualisation of Software Architectures," *Proc Australasian Workshop on Software Architectures*, Melbourne, Australia, 1998, 9 pgs.

(Continued)

*Primary Examiner* — Wei Zhen
*Assistant Examiner* — Mohammed Huda
(74) *Attorney, Agent, or Firm* — Fish & Richardson P.C.

(57) ABSTRACT

An operations management environment is integrated with an information technology infrastructure through an adaptor, the integration occurring while the information technology infrastructure performs one or more tasks. Data from the information technology infrastructure is received through the adapter. Relationships between the artifacts included in the information technology infrastructure are modeled based on the received data. A proposed modification to the information technology infrastructure is determined based on an external change. While the information technology infrastructure performs the one or more tasks, the response of the artifacts to the proposed modification is simulated using the modeled relationships. The response of the artifacts is monitored to determine if the proposed modification implements the external change. A modification is generated based on the proposed modification if the proposed modification implements the external change, and the information technology infrastructure is updated while the information technology infrastructure performs the one or more tasks.

18 Claims, 9 Drawing Sheets

(56) References Cited

OTHER PUBLICATIONS

'Business Process Modeling Notation (BPMN), Version 1.0' [online]. White, 2004, [retrieved on Jun. 19, 2008]. Retrieved from the Internet: <URL: http://www.bpmn.org/Documents/BPMN%20V1-0%20May%203%202004.pdf>, 296 pgs.

Chen, P., "The Entity-Relationship Model—Toward a Unified View of Data," *ACM Transactions on Database Systems*, 1976, 1 (1): 9-36.

Lin, T., "Visualizing relationships for real world applications," *Proceedings of ACM Information Visualization and Manipulation Workshop*, 2000: 78-81.

Lin, T. and O'Brien, W., "FEPSS: A Flexible and Extensible Program Comprehension Support System," *Proceeding of IEEE 5th Working Conference on Reverse Engineering*, 1998: 40-49.

Ambler, S.W., "Dynamic Object Modeling" in *The Object Primer: Agile Model Driven Development with UML 2.0*, (New York, Cambridge University Press, 2004), pp. 319-350.

Booch, et al.. "Interfaces, Types, and Roles" in *The Unified Modeling Language User Guide*, (Redwood City, CA, Addison Wesley, 1999), pp. 155-167.

Booch, et al.. "Interactions" in *The Unified Modeling Language User Guide*, (Redwood City, CA, Addison Wesley, 1999), pp. 205-218.

Booch, et al.. "Systems and Models" in *The Unified Modeling Language User Guide*, (Redwood City, CA, Addison Wesley, 1999), pp. 419-427.

\* cited by examiner

600

| Event-ID | Page-ID | Timestamp | User-ID |
|---|---|---|---|
| 0123 | 0001 | 2007·11·01 12:11:00 | 0002 |
| 0124 | 0002 | 2007·11·01 13:11:00 | 0002 |
| 0125 | 0001 | 2007·11·01 14:11:00 | 0002 |
| 0126 | 0002 | 2007·11·01 13:11:00 | 0003 |
| 0127 | 0008 | 2007·11·01 13:11:00 | 0004 |
| 0128 | 0007 | 2007·11·01 15:11:00 | 0002 |

610

615

620

620b  620a

FRAMEWORK FOR MANAGING COMPLEX OPERATIONS

CROSS-REFERENCE TO RELATED APPLICATIONS

This application claims the benefit of U.S. Provisional Application No. 60/991,489, titled FRAMEWORK FOR MANAGING COMPLEX OPERATIONS and filed on Nov. 30, 2007, which is incorporated herein by reference in its entirety.

TECHNICAL FIELD

This description relates to an operations management environment for non-destructive monitoring, modeling, and updating of an information technology infrastructure.

BACKGROUND

Information technology infrastructures are complex systems that are often used to process and manage data. To process and manage the data, an enterprise may use various applications, information, processes, systems, and other components (which may be referred to as "artifacts"). Information technology infrastructures generally include a large number of artifacts having complex relationships with each other. The complexity of the relationships among the artifacts, and the complexity of the operations used to manage and process the data may make updating the information technology infrastructure challenging.

SUMMARY

In one general aspect, an information technology infrastructure is non-destructively updated using an operations management environment. An operations management environment is integrated with an information technology infrastructure through an adaptor, the integration occurring while the information technology infrastructure performs one or more tasks. Data from the information technology infrastructure is received through the adapter. The data is generated by activity of artifacts included in the information technology infrastructure, and the artifacts are configured to perform the one or more tasks. Relationships between the artifacts included in the information technology infrastructure are modeled based on the received data. A proposed modification to the information technology infrastructure is determined based on an external change. While the information technology infrastructure performs the one or more tasks, the response of the artifacts to the proposed modification is simulated using the modeled relationships. The response of the artifacts is monitored to determine if the proposed modification implements the external change. A modification is generated based on the proposed modification if the proposed modification implements the external change, and the information technology infrastructure is updated with the modification by pushing the modification through the adaptor while the information technology infrastructure performs the one or more tasks.

Implementations may include one or more of the following features. Modeling the relationships between the artifacts included in the information technology infrastructure may include triggering events in one or more of the artifacts, and the events may be associated with at least one context and the events may result from an activity the artifacts. Modeling the relationships between the artifacts also may include receiving data produced by the event, aggregating the received data based on the at least one context associated with the data, and determining relationships between the one or more of the artifacts based on the aggregated data. The relationships between the one or more artifacts may depend on the context. The context may include an interaction between the artifacts and a user that has a defined level of access to the artifacts. The artifacts may include a process implemented by the information technology infrastructure. The artifacts may include a sensor.

The modification may be a change to one or more existing tasks performed by the information technology infrastructure. The modification may be a new task. Relevant artifacts may be identified from among the artifacts included in the information technology infrastructure, where the relevant artifacts may be artifacts capable of performing the modification. Identifying the artifacts included in the existing information technology infrastructure may include determining the capabilities of the artifacts. Updating the information technology infrastructure with the modification by pushing the modification through the adaptor may include pushing the modification only to the relevant artifacts. The external change may include a change in the operations of an enterprise associated with the information technology infrastructure.

In another general implementation, a system for non-destructively updating an information technology infrastructure includes an adaptor configured to be coupled to an information technology infrastructure and to exchange data with the information technology infrastructure. The system also includes an event module configured to trigger an occurrence in an information technology infrastructure, where the occurrence is performed by artifacts included in the information technology infrastructure, the occurrence creates data, and the occurrence is associated with at least one context. The event model is also configured to aggregate the data created by the occurrence based on the at least one context. The system also includes a modeling module configured to model relationships between the artifacts included in the information technology infrastructure based on the obtained data, and a simulator module configured to generate data and a data flow based on a proposed modification to the information technology infrastructure, and test the proposed modification using the modeled relationships and the generated data while the information technology infrastructure continues to perform tasks. The system also includes an interface module configured to output the modeled relationships, and receive input related to the proposed modification and the modeled relationships.

Implementations include one or more of the following features. The at least one context may include an interaction between the artifacts and a user that has a defined level of access to the artifacts. An event repository may be configured to store the aggregated data. The interface module may be configured to output data from the event repository.

Implementations of any of the techniques described above may include a method or process, an apparatus or system, or computer software on a computer-accessible medium. The details of particular implementations are set forth in the accompanying drawings and description below. Other features will be apparent from the following description, including the drawings, and the claims.

DETAILED DESCRIPTION

Figure 1:
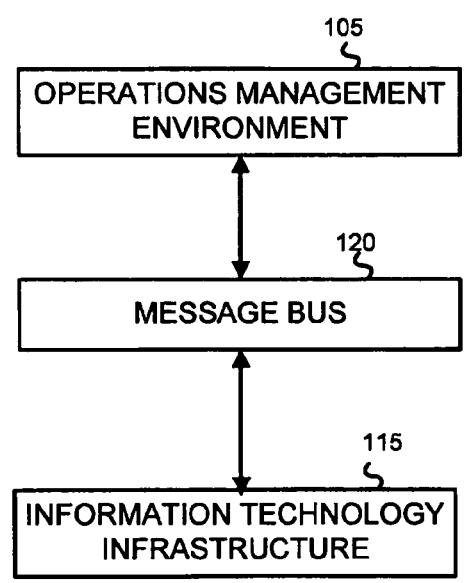
FIGS. 1, 2, and 4 are block diagrams of an information technology infrastructure.

FIG. 1 illustrates a system architecture 100 in which an operations management environment 105 non-destructively models, monitors, and updates an existing information technology infrastructure (IT infrastructure) 115. The IT infrastructure 115 includes information, processes, and systems (which may be referred to as "artifacts") used in the operation of an enterprise. The operations management environment 105 runs independently of the IT infrastructure 115 such that the operations management environment 105 does not interfere with the execution of the processes, applications, and tasks implemented by the IT infrastructure 115. In particular, the operations management environment 105 allows the enterprise to observe, manage, and modify the IT infrastructure 115 while the IT infrastructure 115 continues to perform tasks related to the operation of the enterprise. Thus, the operations management environment 105 "non-destructively" observes, manages, and updates the IT infrastructure 115. Additionally, after the IT infrastructure 115 has been modified using the operations management environment 105, the operations management environment 105 may be removed from the IT infrastructure 115. Moreover, new operations and business processes may be developed first in the operations management environment 105, tested, and pushed to the appropriate artifacts in the IT infrastructure 115. In some implementations, the operations management environment 105 may determine the appropriate artifacts to which the new operations are pushed.

The operation of an enterprise involves supporting many different business roles and entities within the enterprise as well as supporting extensive interactions with other enterprises. These business roles, entities, and interactions are associated with large amounts of data and information. Because the IT infrastructure 115 includes artifacts used to support the operations of the enterprise, the IT infrastructure 115 tends to be complex and tends to have many inter-related components. For example, the IT infrastructure 115 includes extensive and distributed business information, complex business applications and systems (such as Enterprise Resource Planning (ERP) systems, Customer Relationship Management (CRM), Supply Chain Management (SCM) systems, inventory management systems, accounting systems, and sales systems), and business processes. The IT infrastructure 115 includes processes and systems within the control of the enterprise as well as processes and systems not under the direct control of the enterprise. For example, the supply chain management system may be associated with a first enterprise (e.g., a retail store) and the inventory management system may be associated with a second enterprise (e.g., a manufacturer). Although under the control of different enterprises, the supply chain management system and the inventory management system still exchange data.

The IT infrastructure 115 also may include other devices that exchange data with the enterprise and/or artifacts under the control of the enterprise. For example, the IT infrastructure 115 may include radio-frequency identification (RFID) readers, sensors, and tracking devices. As a result of the complexity of the enterprise's operations, the IT infrastructure 115 also tends to be complex, which may make observing, managing, and modifying the IT infrastructure 115 without disrupting the IT infrastructure challenging.

The operations management environment 105 allows the enterprise to model and visualize the relationships between the artifacts included in the IT infrastructure 115 and to monitor the flow of operations implemented by the IT infrastructure 115. The operations management environment 105 also allows the enterprise to simulate proposed modifications to one or more artifacts included in the IT infrastructure 105 without interfering with the operations implemented by the IT infrastructure 105. The modifications may be proposed, for example, to accommodate changes in the business operations of the enterprise due to changes in laws, globalization, mergers and acquisitions, corporate restructuring, changes in supply of raw materials, an increase in orders due to an expanding customer base, and/or outsourcing. The operations management environment 105 also may be used to determine how the IT infrastructure 105 responds to the addition, removal, upgrading, or repositioning of artifacts included IT infrastructure 105.

The operations management environment 105 allows the enterprise to test, monitor, and analyze the impact of the proposed modifications on the IT infrastructure 115 through a simulator. Once it is determined that the proposed changes to the IT infrastructure 115 implement the changes in the business operations properly, the operations management environment 105 updates the IT infrastructure 115 by pushing the modification to the appropriate artifacts of the IT infrastructure 115 through a message bus 120.

Figure 2:
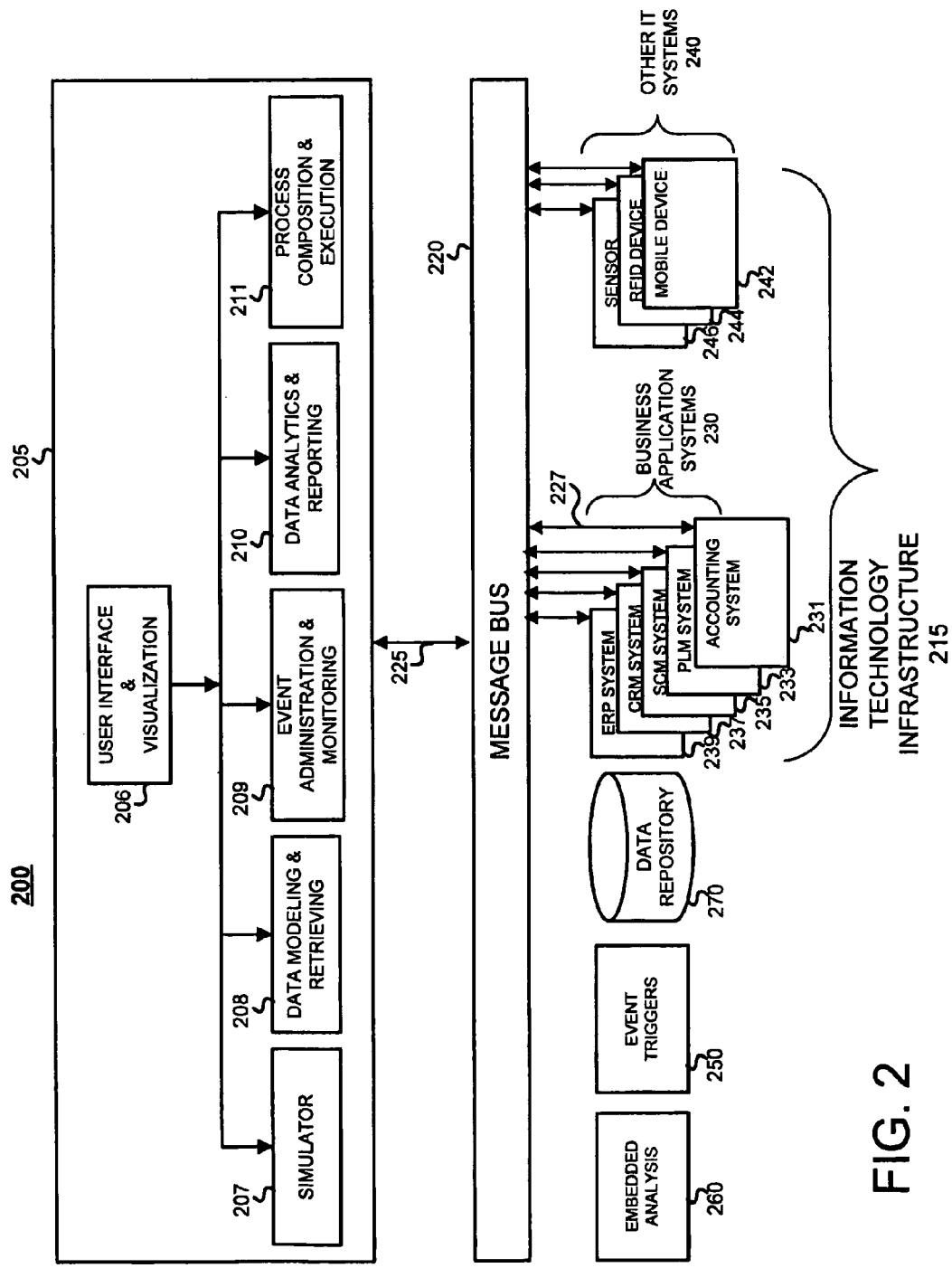

In greater detail, and referring to FIG. 2, an example system 200 includes an operations management environment 205 configured to non-destructively model, monitor, and modify an IT infrastructure 215. The operations management environment 205 allows modification to artifacts affected by the change in business operations by pushing modifications to the affected artifacts 215 over a message bus 220. The operations management environment 205 may be integrated with the IT infrastructure 215 through an adaptor 225. The adaptor 225 may be an application programming interface (API).

The operations management environment 205 includes a user interface and visualization component 206, a simulator 207, a data modeling and retrieving module 208, an event administration and monitoring module 209, a data analytics and reporting module 210, and a process completion and execution module 211.

A user of the operations management environment 205 interacts with the operations management system 205 through the user interface and visualization component 206. The user interface and visualization component 206 allows the user to view and create a data model of relationships between the artifacts included in the IT infrastructure 215 and to retrieve data associated with the IT infrastructure 215, such as data associated with the use of particular artifacts include in the IT infrastructure 215. The user interface and visualization component 206 also allows the user compose new business processes and monitor the response of the IT infrastructure 215 to the new business processes.

The simulator 207 allows the operations management system 205 to simulate the response of the IT infrastructure 215 to a proposed change to one or more artifacts of the IT infrastructure 215 without interfering with the ongoing processes of the IT infrastructure 215. The simulator 207 generates data used to simulate the behavior of the IT infrastructure 215.

The operations management environment 205 also includes a data modeling and retrieving module 208. The data modeling and retrieving module 208 models relationships between artifacts included in the IT infrastructure 215. The data modeling and retrieving module 208 defines categories of artifacts and the relationships between the artifacts within or across the categories. The module 208 also defines the operations for obtaining information associated with the artifacts and the relationships among the artifacts. In general, the data obtained by the module 208 may be either static data or dynamic data. Dynamic data are the data generated during executions of applications or processes by the IT infrastructure 215. Dynamic data may be obtained by retrieving data created by executions of processes by artifacts in the IT infrastructure 215 and from data pushed to the IT infrastructure 215.

The operations management environment 205 also includes an event administration and monitoring module 209. The term event may refer to an occurrence triggered by the activity of, for example, one or more of the artifacts included in the IT infrastructure 215 or any other occurrence in the IT infrastructure 215. Additionally or alternatively, an event may be an occurrence in the operations management environment 205. For example, an event may refer to a visit to a web page included in the enterprise's internal web site. In another example, an event may refer to an activity of a sensor included in the IT infrastructure 215.

The event administration and monitoring module 209 administers and monitors events. The module 209 administers events by triggering the occurrence of events in the IT infrastructure 115. For example, the event administration may cause a temperature sensor included in the IT infrastructure to report the temperature in the vicinity of the sensor. The module 209 also monitors events by aggregating data associated with the triggered events. For example, the event administration and monitoring module 209 may aggregate data produced by the temperature sensor over a period of time. In some implementations, events may be represented as software/data packets that are received at the module 209 from any number of artifacts included in the IT infrastructure 215. Data describing the event may be included as an event descriptor in the data packet received for the event. For example, the event descriptor may include an identifier of the artifact that produced the event, a time stamp, an event type (e.g., sensor temperature data), an event source (e.g., temperature sensor), a location of the source event, or other information.

In one specific example, a temperature sensor may send an event of type "temperature reading" from a sensor located in a container "abcd1234" used to transport perishable food items indicating that the temperature in the container "abcd1234" was "28° F" at "10:00 am Nov. 26, 2007."

The data associated with an event may be aggregated according to a context associated with an event. A context may be, for example, a time of day, a geographic location, an interaction with a particular user or category of user, or a type of functionality associated with the artifact that produced the event. Additional examples of a context include linkages between web pages, business flow, data flow, and control flow of services and/or components. For example, events may be aggregated based on an interaction between a particular category of employee of the enterprise such as sales personnel and/or accounting personnel with a business process.

Aggregating events based on context allows the IT infrastructure 215 to be analyzed from different perspectives. The term "perspective" may refer to a particular aspect of the performance of the IT infrastructure 215 or any other performance metric. For example, the perspective may be network security, computational efficiency, and/or business flow efficiency. Thus, the IT infrastructure 215, and/or the artifacts included in the IT infrastructure 215, may be analyzed, for example, from a security standpoint, an efficiency standpoint, and/or a data flow standpoint.

In one example, the IT infrastructure may be analyzed from a security perspective. Although the enterprise's accounting personnel and sales force personnel both may have access to the IT infrastructure 215, these groups tend to not have equal privileges to use and/or access the artifacts of the IT infrastructure 215. For example, accounting personal may have permission to use an internal web-based application for updating data in the enterprise's accounts receivable database, but accounting personnel may not have permission to use an internal web-based application for updating information in an application that tracks sales orders. Thus, by analyzing events (such as visits to particular pages included in the enterprise's internal web site) aggregated by employee category, a user of the operations management environment 205 may determine whether a change to the access permissions on the internal web site is needed based on whether the proper employees are accessing appropriate web sites by analyzing the behavior of the IT infrastructure 215 from a security perspective.

In another example, events may be analyzed from a data flow perspective. In this example, the events occurring during a business process are analyzed to ensure that the events occur in a proper order. For example, a specialty pet store orders one hundred pallets of gourmet cat food formulated for Siamese cats from the enterprise. The enterprise subsequently bills the pet store for the cat food order and enters the bill into an accounting system as part of accounts receivable. In this example, the entry of the bill generates an event (event A). The event A has a context associated with accounts receivable. When the pet store pays the bill, the amount of payment is entered into the accounting system as a paid invoice. In this example, the entry of the paid bill generates an event (event B). The event B has a context associated with paid invoices. The proper data flow for this example is that amount of the invoice for the cat food order is entered into an accounting system as part of accounts receivable before the amount of the amount is entered in the accounting system as a paid invoice. By analyzing the events A and B, data associated with events A and B, and contexts associated with events A and B, the user of the operations management environment 205 may explore the system execution from the data flow perspective and determine that the accounting system is processing data in the proper order.

The data analytics and reporting module 210 manages embedded analysis components 260 and event triggers components 250, both of which are discussed in more detail below. The data analytics and reporting module 210 may create event filtering operations and push the filtering operations to the artifacts in the IT infrastructure. As discussed above, an event may occur, for example, when an artifact included in the IT infrastructure executes an application, a business process, or when a particular interaction between a user and a process occurs. The operations management environment 205 receives and monitors the events in order to analyze and model the behavior of the IT infrastructure 215. However, because the IT infrastructure 215 is large and complex, a large number of events occur within the IT infrastructure 215, which may make analyzing the events challenging. Thus, the data analytics and reporting module 210 may create event filters such that the operations management environment 205 only receives events of interest.

Event filtering operations may be generated by the data analytics and reporting module 210 to target the occurrence of certain events such that the operations management environment 205 only monitors events of interest. In general, event filters may be topic-based, rule-based, or classification-based. Topic-based event filters are filters that target events associated with particular subject matter or topic. For example, a topic-based event filter may filter events related to interactions with the enterprise's accounting system. Rule-based filters are filters that screen events based on pre-defined rules such as time of day that the event occurred. Classification-based event filters filter events based on the event including certain categories/types of data.

The data analytics and reporting module 210 may push the event filters to the embedded analytics components 260, which are generally distributed throughout the IT infrastructure 215, or directly to artifacts included in the IT infrastructure 215. The event filters may be implemented as business logic. The data analytics and reporting module 210 also may aggregate data associated with the events. As discussed below, in some implementations the data associated with events may be collected by the embedded analytics components 260. In some implementations, the data associated with events may be received directly from the artifacts included in the IT infrastructure 205.

The data analytics and reporting module 210 also generates reports based on the aggregated data. The reports may be visualized using the user interface and visualization module 210 and/or the reports may be stored in a data repository 270 for later analysis and/or viewing. Additionally, the logic for triggering events through the event triggers components 250 may be pushed from the data analytics and reporting module 210.

The operations management environment 205 also includes a process composition and execution module 211 that composes and executes business processes. In general, a business process refers to a formalized workflow or progression of tasks/events that are designed to execute a complex task. The business process is performed by one or more artifacts included in the IT infrastructure 215. For example, a business process implemented by a manufacturing enterprise may include scanning a product in a warehouse using an RFID reader to obtain an identifier of the product, storing the identifier of the product in a database application of a warehouse management system, and sharing the identifier of the product, or some other indicator of inventory of the product within the warehouse, with the supply chain management system of a retailer that offers the product for sale. The operations management system 205 implements and modifies business processes through the process composition and execution module 211.

As discussed above, the operations management environment 205 allows the enterprise to model, monitor, and modify the IT infrastructure 215 without interfering with the operation of the IT infrastructure 215 (e.g., non-destructively). The IT infrastructure 215 includes business application systems 230 and other IT systems 240. The business application systems 230 may include applications such as an accounting system 231, a product lifecycle management (PLM) system 233, a supply chain management (SCM) system 235, a customer relationship management (CRM) system 237, and an enterprise resource planning (ERP) system 239. In some implementations, more or fewer applications may be included in the business applications systems 230. In some implementations, more than one instance of a particular type of application may be included business applications systems 230. Additionally, the business application systems 230 may include other application systems used by the enterprise such as warehouse management applications, intranets and internal enterprise web sites, and database applications. The applications included in the business application systems 230 may be applications associated with multiple enterprises, and some of the applications included in the business application systems 230 may be under the control of external enterprises.

The other IT systems 240 may include devices and systems that obtain/store information for use by the enterprise and/or the business application systems 230. The other IT systems 240 may exchange data and information with each other, the enterprise, and/or the business application systems 230. The other IT systems 240 may include mobile devices 242, radio-frequency identification (RFID) modules 244, and sensors 246. The mobile devices 242 may include, for example, cellular telephones, personal digital assistants, and/or two-way pagers. The RFID modules 244 may include RFID tags that uniquely identify physical items in, for example, a warehouse and RFID readers that read the RFID tags. In some implementations, the sensors 246 may be biometric sensors (such as fingerprint scanners), pressure sensors, moisture sensors, and/or ultrasonic sensors. In one example, the sensors 246 may include temperature sensors located on a truck, or other vehicle, that transports frozen food items from a manufacturer to a retail store. In this example, the sensors 246 may be configured by software that implements business logic that causes the sensors 246 to issue an event message when the temperature in the truck has been above −1° C. (about 30° F.) for more than fifteen minutes during any twenty-four hour period.

The business application systems 230 and the other IT systems 240 receive data from and transmit data to the operations management environment 205 through communications links 227. The data may be received and transmitted in the form of a message, a file, a data packet, an application, or any other form of data. The data may be business logic implemented as an executable application or the data may be information included in the file or message. In general, the operations management environment 205 implements modifications to the IT infrastructure 215 by pushing data to appropriate artifacts of the IT infrastructure 215. Continuing the above example, sensors 246 may be temperature sensors configured to issue an event message when the sensors 246 measure a temperature above −1° C. (about 30° F.) for more than fifteen minutes during any twenty-four hour period. A change in business operations may necessitate configuring the sensors 246 such that the sensors 246 issue an event when the sensors 246 measure a temperature above −1° C. (about 30° F.) for more than fifteen minutes during any twenty-four hour period. The operations management environment may implement this configuration change by, for example, pushing business logic to the sensors 246 so that the sensors issue an event when the sensors 246 measure a temperature above −1° C. (about 30° F.) for more than fifteen minutes during any twenty-four hour period.

The system 200 also includes an event triggers component 250. The event triggers component 250 allows the operations management environment 205 to monitor the execution of a particular business process by selectively triggering particular operations within the IT infrastructure 215. The event triggers component 250 interacts with the event administering and monitoring module 209 to trigger events in the IT infrastructure 215. Because the number of business processes included in the IT infrastructure 215 is large, monitoring all of the business processes at once may be computationally expensive. The event triggers component allows the user to execute those business processes that are of interest to be executed and monitored. In some implementations, the event triggers component 250 may be implemented as a plug-in to any artifact in the IT infrastructure 215.

The system 200 also includes an embedded analysis components 260. The embedded analysis components 260 may be distributed throughout the IT infrastructure 215 by implementing the analysis components in one or more of the artifacts included in the IT infrastructure 215. Because of the complexity and vast scope of the artifacts included in the IT infrastructure 215, a vast amount of data is produced by monitoring, modifying, and testing the IT infrastructure 215. Transmitting the data to a central repository and storing and analyzing the data at the central repository may be computationally expensive. Thus, distributing the embedded analysis components 160 throughout the IT infrastructure 215 may improve computational efficiency. The embedded analysis components 260 may store and analyze data collected from the applications and/or devices in which the components 260 are located. The embedded analysis components 260 also may receive modifications to their respective application and/or devices from the operations management environment 205 and distribute the modifications to the appropriate application and/or devices.

In some implementations, the embedded analysis component 260 may be implemented as a plug-in to one or more artifacts included in the IT infrastructure 215. Through the plug-in, data associated with the artifacts may be collected, pre-processed, aggregated, and communicated to the operations management environment 205. The event monitoring module 209 and the data analytics module 210 may further process the data communicated to the operations management environment 205 by the plug-in. The modules 209 and 210 also may produce reports based on the received data. These reports may be viewed using the user interface and visualization module 206 and/or the reports may be stored in a repository for later analysis and browsing.

The system 200 also includes a data repository 270. The data repository 270 may store data collected from the IT infrastructure 215 and reports based on the data. The system 200 may include more than one data repository 270. The data repository 270 may be integrated with one or more of the business applications systems 230 and the other IT systems 240. The data repository 270 may be a centralized data repository that exchanges data with and stores data from the IT infrastructure 215.

Figure 3:
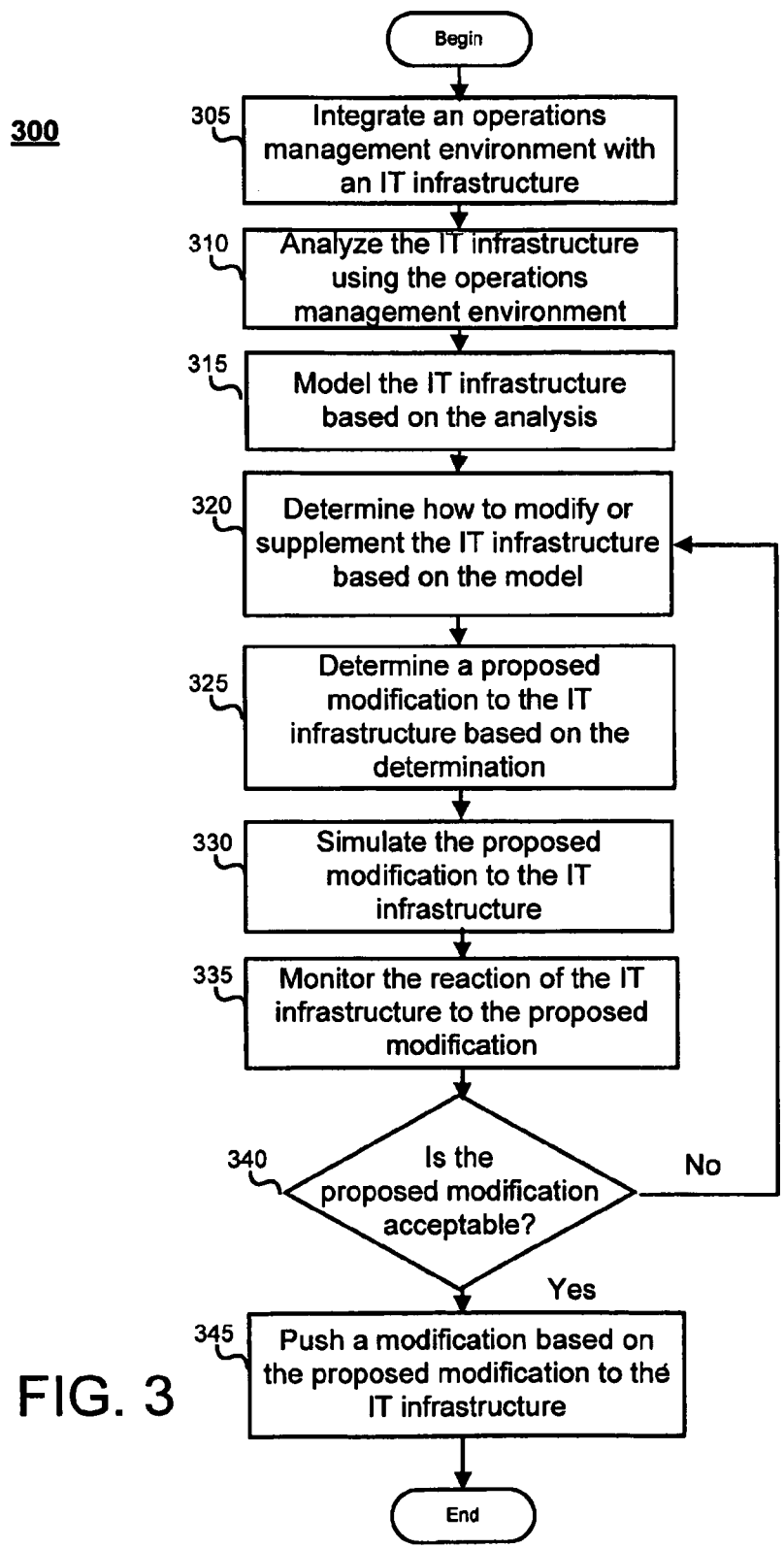
FIG. 3 is a flow chart of a process for updating an information technology infrastructure.

Referring to FIG. 3, an example process 300 models, monitors, and updates an IT infrastructure to accommodate a change in the operations of an enterprise. The IT infrastructure may be, for example, the IT infrastructure 115 or 215 discussed above. The process 300 may be executed by one or more processors included an operations management environment such as the operations management environment 105 or 205 discussed above.

An operations management environment 205 is integrated with the IT infrastructure 215 (305). The operations management environment 205 may be integrated with the IT infrastructure 215 through an adaptor 225. The adaptor 225 may be an API that provides an interface between the operations management environment 205 and the IT infrastructure 215. In general, the adaptor 225 allows the operations management environment 205 and the IT infrastructure 215 to communicate without affecting the configuration and execution of tasks implemented by the IT infrastructure 215. Thus, although the adaptor 225 integrates the operations management environment 205 with the IT infrastructure 215, the operations management environment 205 may be removed from the IT infrastructure 215 without disrupting the IT infrastructure 215.

In some implementations, the adaptor 225 allows the operations management environment to communicate and exchange data with the IT infrastructure through a bi-directional message bus. The bi-directional message bus may be the message bus 220. For example, in some implementations the operations management environment 205 may communicate to the various artifacts included in the IT infrastructure 215 through a publish-and-subscribe model in which messages are pushed from the operations management environment 205 to the message bus 220 and then pushed to the appropriate artifacts of the IT infrastructure 215. The adaptor 225 also includes functions or applications configured to modify rules for event handling within the IT infrastructure 215, add new analytical operations, and integrate the adaptor with the IT infrastructure 215.

The IT infrastructure 215 is analyzed using the operations management environment (310) and the IT infrastructure is modeled based on the analysis (315). In particular, relationships between the artifacts in the IT infrastructure 215 are determined. The analysis and modeling may be performed by, for example, the data modeling and retrieving module 208 discussed above. The model may be based on static relationships between the artifacts of the IT infrastructure 215. Static relationships may be relationships between processes and systems, employee's roles and processes, relationships between database tables and business processes, and relationships between object classes. Static relationships are relationships that do not change over time. Additionally, or alternatively, the model may be based on run-time, or dynamic, relationships between the artifacts of the IT infrastructure 215. Dynamic relationships change over time. For example, run-time relationships may be relationships between users' interactions and business process instances and between triggered events and business process instances. Both the static and dynamic relationships may be relationships that are completely within the enterprise or relationships that span multiple enterprises.

A framework for a model describing relationships between multiple sets of artifacts may be described by Equations (1) to (7), below:

$$M=\{N,R\}; \quad (1)$$

$$N=\{N_1, N_2, \ldots, N_i, \ldots, N_n\}; \quad (2)$$

$$R=\{R_1, R_2, \ldots, R_j, \ldots, R_m\}; \quad (3)$$

$$N_i=\{d_i^a, \{n_1^i, n_2^i, \ldots, n_s^i\}, \{op_1^i, op_2^i, \ldots, op_u^i\}, \{c_1^i, c_2^i, \ldots, c_v^i\}\}; \quad (4)$$

$$R_j=\{d_r^j, \{r_1^j, r_2^j, \ldots, r_t^j\}, \{op_1^j, op_2^j, \ldots, op_x^j\}, \{c_1^j, c_2^j, \ldots, c_y^j\}\}; \quad (5)$$

$$d_i^a=\{s_i^a, \{S_1^i, S_2^i, \ldots, S_k^i\}\}; \quad (6)$$

$$d_j^r=\{s_j^r, \{N_1^j, N_2^j, \ldots, N_l^j\}\}. \quad (7)$$

In Equations (1) to (7), M is a model that includes a set of nodes, N, and a set of relationships R between the nodes. The set of nodes may be expressed as $N=\{N_1, N_2, \ldots, N_i, \ldots, N_n\}$ and the set of relationships may be expressed as $\{R_1, R_2, \ldots, R_j, \ldots, R_m\}$). A node model includes a definition $d_i^a$, the node elements $\{n_1^i, n_2^i, \ldots, n_s^i\}$, operations $\{op_1^i, op_2^i, \ldots, op_u^i\}$, and constraints $c_1^i, c_2^i, \ldots, c_v^i\}$. The definition includes a data schema definition $s_i^a$ and the sources $\{S_1^i, S_2^i, \ldots, S_k^i\}$ from which the node elements of the node set are extracted. The sources may be, for example, a system, a database table, and/or a process. The operations include the basic services for handling the node elements and the constraints define conditions and restrictions for these operations. A relation model is similar to the one for a node model. In a relation model, the relationships are extracted from the node sets rather than the sources directly. A model structure is defined as the model mechanism described above without the node elements and relation elements.

In one example, an application may be modeled using the above framework. The modeling may be implemented in software or hardware. The application includes functions, but the enterprise wants to add the context of libraries, which includes functions, to the software application. In this example, the functions act as nodes and calls between the functions act as relationships between the nodes. Additionally, the enterprise wants to add functions to the libraries with the constraint that the functions be placed in the libraries in the most efficient manner possible. Thus, the model has a constraint that the functions be allocated among the libraries such that function calls between libraries are maximized while function calls between functions are minimized.

Additionally, the model may be interactively built by a user or automatically by the system. In general, two levels of modeling may be supported. The first allows a user or the system to add a new context or expand an existing context. The second allows the user or the system to add a new context schema or modify a context schema. Continuing with the above example, adding libraries to the application program adds a new context. Subsequently adding additional libraries expands an existing context (e.g., the existing context of libraries).

Although the above example relates to an application, in other examples more complex processes and systems may be modeled using the same approach. Thus, using the example process 300, a user or a system is able to expand a context or add a new context to the model as the IT infrastructure 215 is running. Additionally, the user or the system may define the elements for the model at run time. The model of the relationships among the artifacts of the IT infrastructure 215 may be visualized using a user interface such as the user interface and visualization module 206 discussed above with respect to FIG. 2. Continuing the above example, the calls between the functions may be visualized through the user interface.

Figure 4:
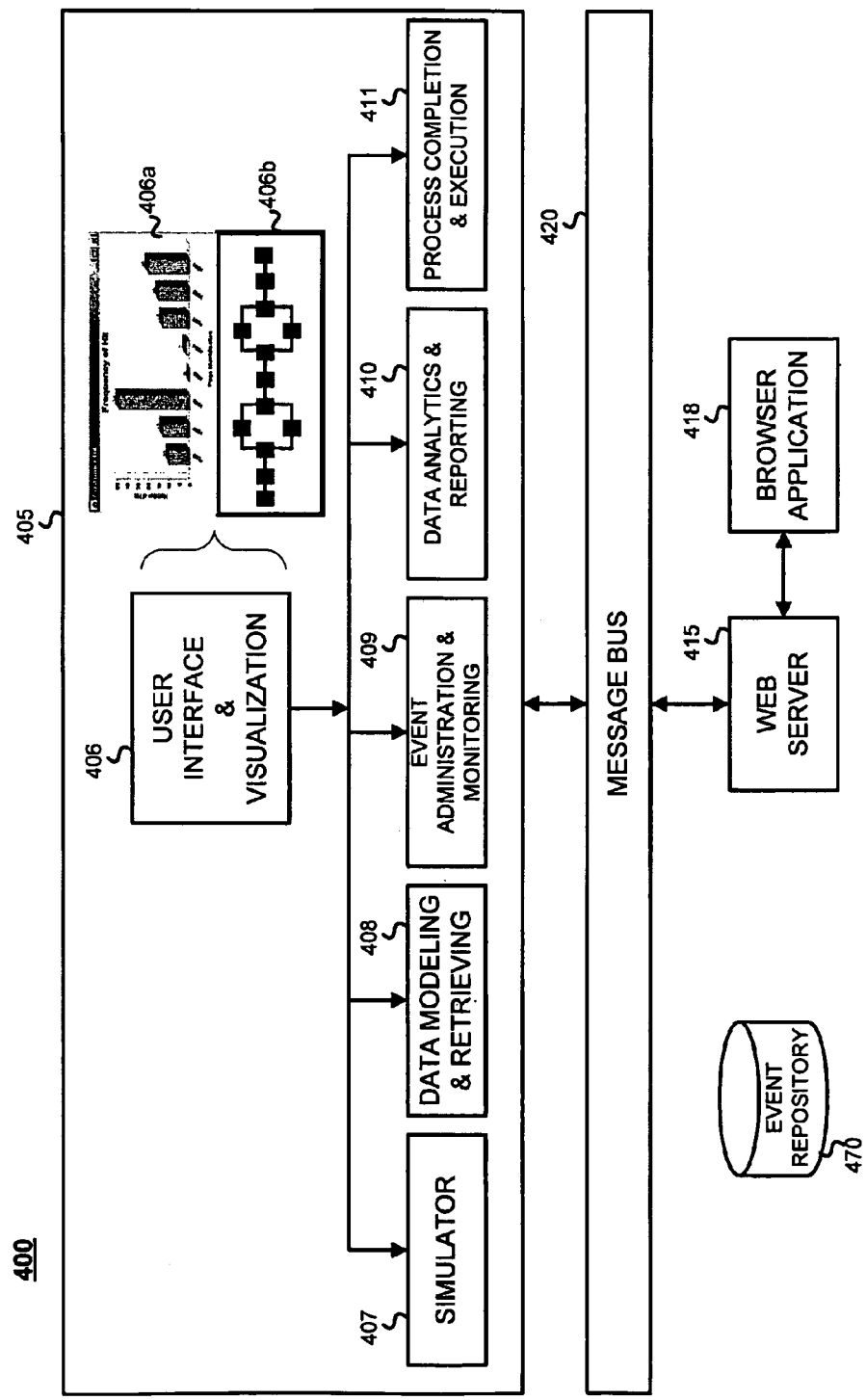

Accordingly, a user of the operations management environment 205 may visually navigate through the IT infrastructure 215 using the model. Referring briefly to FIG. 4, the visualization module 206 may display the model through graph-based displays 406*a* and 406*b*. Multiple node sets and relation sets may be displayed in the same view. Additionally, the user may include or remove node sets or relation sets from the display.

Returning to FIG. 3, modification or supplementation of the IT infrastructure 215 is determined based on the model (320). The model may be used to determine how to modify the IT infrastructure 215 (e.g., make a change to an existing process or system) or how to supplement (e.g., add additional functionality to the IT infrastructure 215) in order to accommodate a change in the operations of the enterprise. Because the operations of the enterprise are intertwined with and implemented by the IT infrastructure 215, some of the artifacts of the IT infrastructure 215 may be modified to update the artifacts in accordance with the change. The change in operation of the enterprise may be a result of forces beyond the control of the enterprise such as a change in the laws of a jurisdiction in which the enterprise operates. For example, the jurisdiction may change its tax and compliance laws, thus requiring the enterprise to update the enterprise's accounting and financial systems. In another example, the business operations of the enterprise may change as a result of a merger or acquisition or a decrease in the supply of a raw material used in the enterprise's manufacturing processes.

In one example, a change in business operations may result from a change in the laws regulating the transportation and storage of perishable items in a jurisdiction in which the enterprise conducts business. In this example, the law is changed such that any storage unit used to transport or store frozen food may not be above −1° C. (about 30° F.) for more than ten minutes out of any twenty-four hour period. The operations of the enterprise may include the transportation and storage of frozen foods. Thus, the enterprise may monitor the temperature of the frozen food storage units on trains, trucks, and in warehouses through temperature and moisture sensors that communicate environmental data to the enterprise. The temperature and moisture sensors may be sensors such as the sensors 246 discussed with respect to FIG. 2.

The change in the law regulating the shipping and storage of frozen foods may require that the enterprise's warehouse application and supply chain applications be updated such that the appropriate data is collected and analyzed from the sensors 246 to ensure that the enterprise is complying with the new law and to provide sufficient data to show compliance with the new law. However, the change in the laws regulating the transportation and storage of perishable items may leave many of the artifacts of the IT infrastructure 215 unaffected. Thus, identification of the affected artifacts using the model generated in (315) may make the updating process more efficient by targeting for updating only those artifacts that are affected by the new law.

Once the model is generated, the operations management environment 205 may determine which artifacts of the IT infrastructure 215 need to be updated to accommodate the change in the law by identifying which functions, applications, and processes need to be modified to accommodate the change in the law. Using the operations management environment, message events may be triggered using the event administering and monitoring module 209 to identify which artifacts in the IT infrastructure 215 are using the affected functions, applications, and processes. The message events may be triggers generated by the event triggers 250 that cause the artifacts to execute the application and report the results to the operations management environment. Thus, the affected artifacts may be identified by selectively triggering certain processes rather than monitoring all events produced by all activity of all of the artifacts in the IT infrastructure 215. The affected artifacts may be referred to as "relevant artifacts." This technique may result in improved computational efficiency resulting from having to execute fewer applications and receiving a smaller volume of data from the IT infrastructure 215 to analyze.

A proposed modification to the IT infrastructure 215 may be determined based on the identification of the relevant artifacts (325). Continuing the above example, the proposed modification may be business logic implemented in an application that causes temperature sensors located in frozen food storage units to issue an event when the temperature in the storage unit exceeds 30° F. for more than ten minutes out of a twenty-four hour period. The proposed modification may be simulated (330). The simulation may be performed by the simulator module 207 discussed above with respect to FIG. 2. The simulation module 207 may create data to simulate conditions under which the sensor should issue an event and monitor the behavior of the IT infrastructure 215 as it processes the data. The results are used to determine whether the sensor issues an event under the appropriate conditions.

Whether the proposed modification is acceptable is determined (340). For example, if the temperature sensors issue an event when presented with simulated data indicating that the temperature is above exceeds −1° C. (about 30° F.) for more than ten minutes out of a twenty-four hour period, the proposed modification is acceptable. Thus, a proposed modification to the IT infrastructure 215 that is consistent with the change in the business process is acceptable. If the change is determined to be acceptable, a modification to the IT infrastructure 215 based on the proposed modification is pushed to the appropriate artifacts (345). Continuing the example above, business logic implemented as instructions may be pushed from the operations management environment 205 through the message bus 220 to temperature sensors that monitor frozen food storage units. The instructions may be stored on a computer-readable medium included in the sensor and executed by a processor in the sensor. If the proposed modification is not acceptable, the example process 300 returns to (320). Thus, the example process 300 may be iterated until an acceptable proposed modification is determined.

Referring to FIG. 4, an illustration of a system 400 shows an example of an operations management environment 405 used to model, monitor, manage, and update a web server 415. The web server 415 may be included in an IT infrastructure such as the IT infrastructure 215 discussed with respect to FIG. 2.

In the example shown in FIG. 4, the web server 415 supports an internal enterprise web site that includes many thousands of individual web pages. Because the web site includes many thousands of individual web pages and is used frequently by members of the enterprise for a variety of tasks, determining usage patterns and updating the web site may be challenging. In this example, the operations management environment 405 models the relationships among the web pages included in the enterprise's web site, manages the web site, and updates the web server 415. The relationships between the web pages included in the enterprise's internal web site may be determined. The relationships between the web pages and the interactions with the web pages may be visualized using graph-based displays 406a and 406b generated by the user interface and visualization module 406. In this example, the graph-based display 406a shows the number of times a particular web page has been visited. The graph-based display 406b shows a representation of the logical relationship between some or all of the web pages that make up the web site.

The operations management environment 405 may, for example, monitor visits to the web pages, monitor the behavior of the visitors to the web site (e.g., track the visitor's selections on the web page and time spent on the web page), discover broken links, discover "orphan" pages (e.g., web pages that have no or few visitors), determine whether only visitors with appropriate privileges are able to access restricted web pages, and/or determine the popularity of particular web pages.

Similar to data analytics and reporting module 210 discussed above, the data analytics and reporting module 410 creates event filtering operations that are pushed to the web server 415. In this example, an event may be an interaction between a user and a web page such as a user visiting the web page. The event filtering operation may specify that only visits made to certain pages be reported.

Figure 5A:
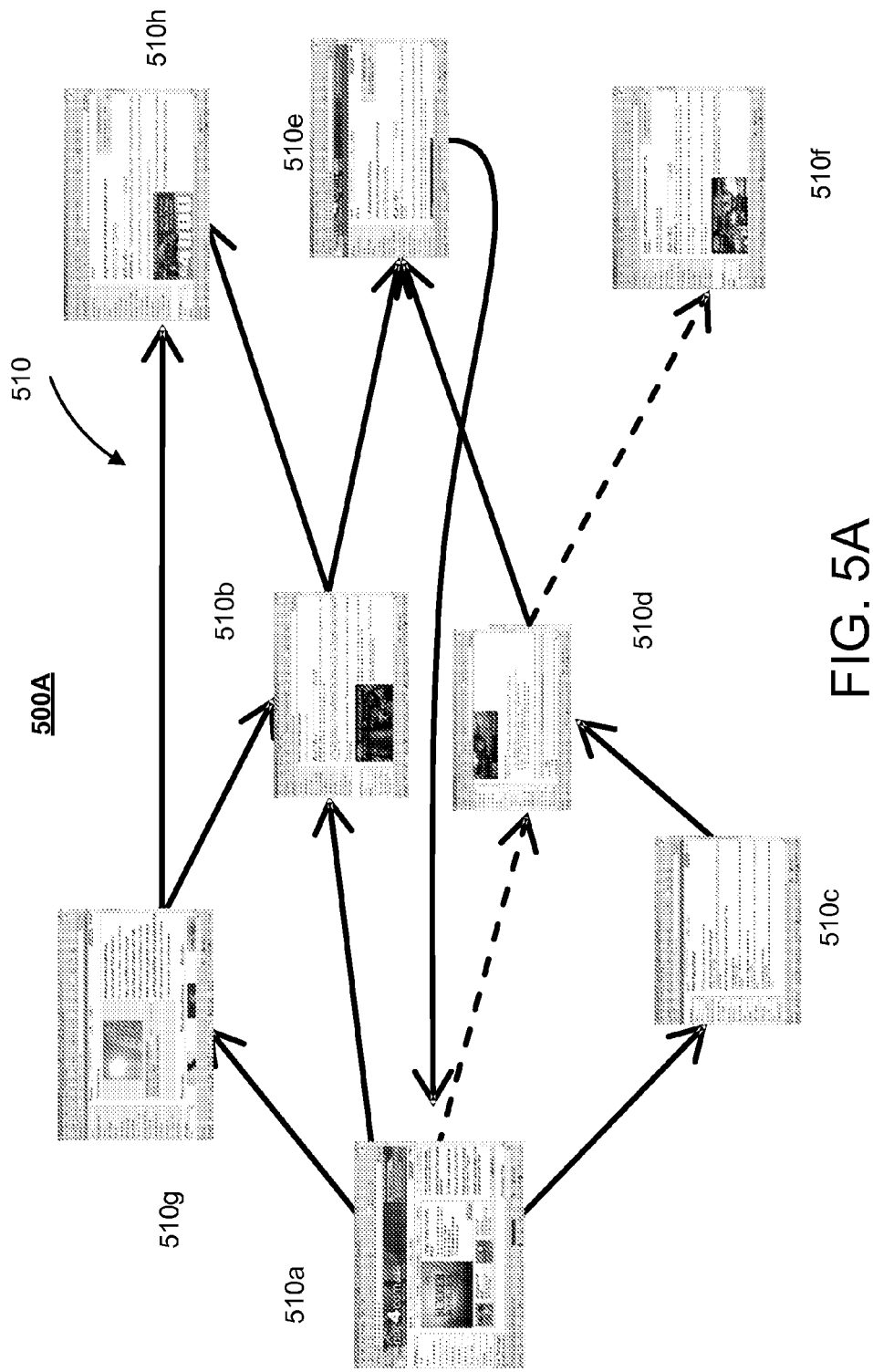
FIGS. 5A, 5B, and 6 are illustrations of an interactive visualization tool for modeling an information technology infrastructure.
Figure 5B:
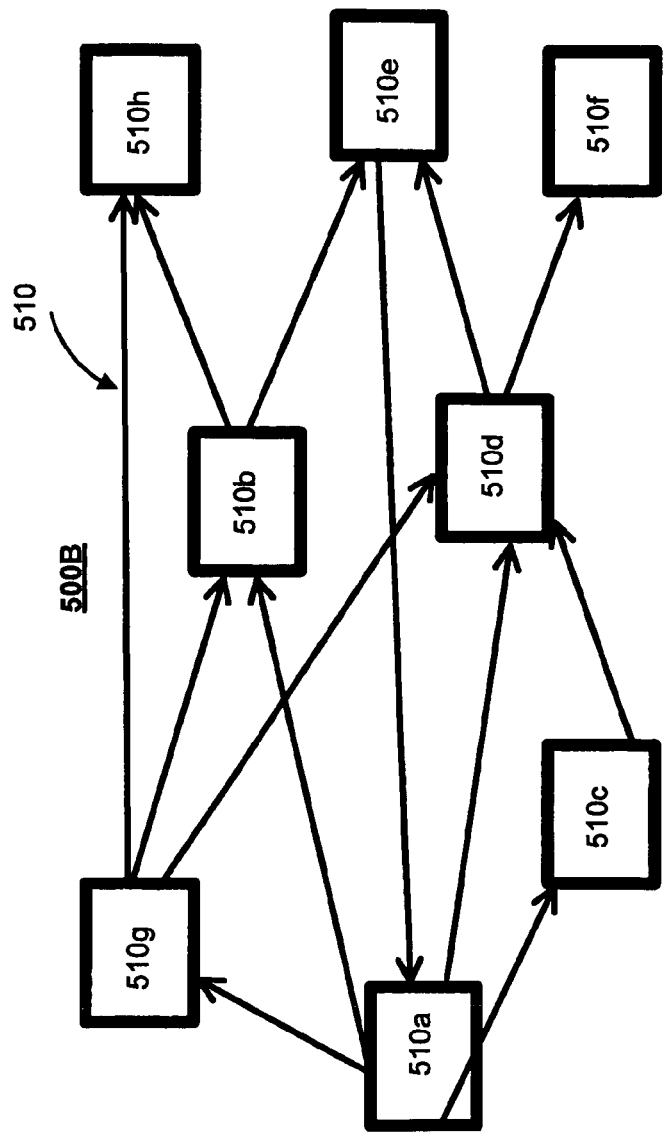

Referring to FIGS. 5A and 5B, logical relationships between eight web pages 510a-510h included in the internal web site 510 are illustrated. FIG. 5A shows an example in which screen shots of the web pages 510a-510h are shown, and FIG. 5B shows an example in which alternate representations of the web pages 510a-510h are shown. The logical relationships between the web pages 510a-510h may be derived by, for example, analyzing the links included in the pages 510a-510h. Although eight web pages are shown in the illustration, the enterprise's web site 510 typically includes many thousands of web pages. In the illustration shown, the web site 510 is modeled with the web pages 510a-510h acting as the nodes and the links between the pages determining the relationships between the pages.

Figure 6:
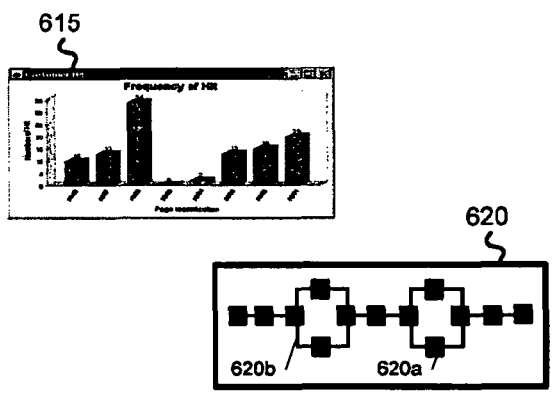

Referring to FIG. 6, an event record 610 includes data associated with events received by the operations management environment 405. In this example, an event is generated when a user visits one of the web pages 510a-510h included in the enterprise's internal web site 510. In this example, the event record 610 includes an event identifier ("Event-ID") that identifies the event, an identifier of the web page ("Page-ID"), a time stamp indicating when the event occurred, and a user identifier that identifies the user whose visit to the web page identified by the "Page-ID" generated the event. The event record may be stored in the event repository 470.

The events may be visualized using the graph-based display 615. The graph-based display 615 shows a bar chart representing the number of visits to each of the web pages 510a-510h. The graph-based display 615 may be shown by the user interface and visualization module 406. The graph-based display 615 provides dynamic visualization of the web site 510 because the graph-based display 615 combines past events (which may be stored in the event repository 470) with events received and updates the graph-based display 615 concurrently or shortly after with receiving the events. In the example shown, rather than receiving an event every time any web page included in the web site 510 is visited, only visits to the web pages 510a-510h are received. The graph-based display 615 allows the user of the operations management environment 405 to analyze and explore the behavior of the web site 510. For example, the user may note that there have been no visits to the web page corresponding to the Page-ID "0005" and there have been few visits to the web page corresponding to the Page-ID "0004."

The graph-based display 620 shows a representation of the relationships between the web pages included in the web site. The graph-based display 620 allows the user of the operations management environment 405 to further explore the web site. The nodes (such as node 620a) represent web pages in the graph-based display 620 and the relationships (such as relationship 620b) represent links between the web pages. Selecting a node results in visiting the web page associated with the node.

For example, to investigate the low number of visits to the web pages "0004" and "0005" the user of the operations management environment 405 may visit the web page by selecting the node corresponding to that web page. Visiting the page may help the user determine the reason for the low number of visits. For example, the page might not include any links or content of interest. Additionally, the operations management environment may allow the user to simulate visits to web pages that are linked to the web pages "0004" and "0005" to determine whether an existing link is broken and needs to be updated. If there is a broken link, the user may simulate replacing the broken link using the simulator module 407. The operations management environment 405 may monitor the events generated by replacing the link and the graph-based display 615 may be updated accordingly. Thus, the operations management environment 405 may be used to determine whether the cause of a low number of visits is a broken link, and, if so, how to repair the link.

Additionally, the model may be expanded dynamically. For example, the context may be expanded by adding a new link to a web page, which would result in an additional node and link on the graph-based display 620. The context may be expanded either by a user of the operations management environment 405 or autonomously by the system. The context may be expanded while the IT infrastructure 415 is running (e.g., performing tasks) and/or while the operations management environment 405 is running.

Figure 7:
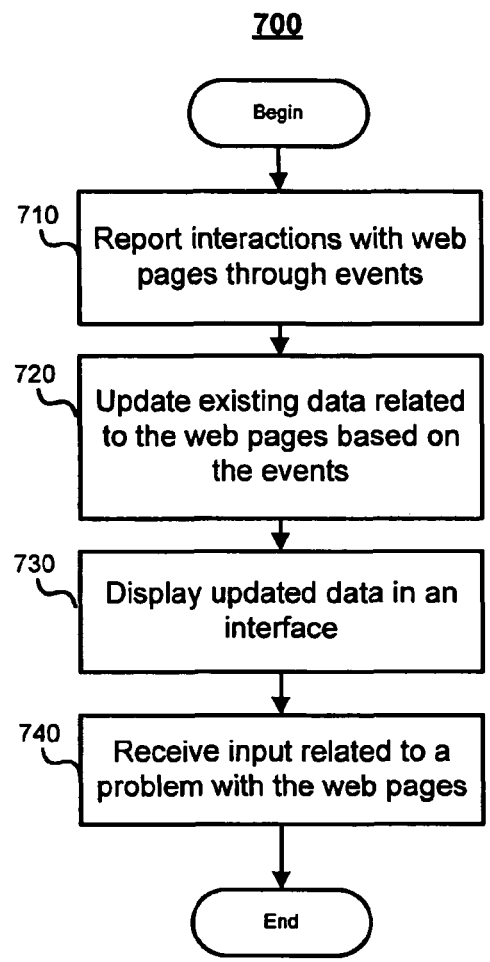
FIG. 7 is a flow chart of a process for modeling and visualizing an information technology infrastructure.

Referring to FIG. 7, an example process 700 monitors and provides information about a web site. Interactions with web pages are reported through events (710). The events may be a visit to the web page by a user. Existing data related to the web pages is updated based on the events (720). For example, the existing data may include the number of visits to each web page over a certain period of time. The existing data may be updated with the received data and displayed in an interface (730). For example, the data may be displayed as the graph-based displays 406a and 406b through the user interface and visualization module 406. Input related to a web page may be received (740). For example, a selection of a node (which represents a web page) may be received through the graph-based display 406b. As discussed above, selection of the node allows the user to interactively explore the web site.

As discussed above, an operations management environment (such as the operations management environments 105 and 205) is a separated and independent environment that may be integrated with and later removed from an existing IT infrastructure (such as the IT infrastructure 115 and 215). New operations may be developed and tested without the change of existing IT Infrastructure. After the modified operations or new operations are tested by the operations management environment, the operations management environment may assist in identifying the appropriate artifacts and to make corresponding changes to the appropriate artifacts such that the modification is implemented.

The artifacts in the existing IT infrastructure may send out their execution information by triggering events. Through a global and generic configuration, the events can be triggered. The operation management environment associates events with a context. Through this approach, the artifacts of the existing IT infrastructure do not to do experience any change, but the monitoring and processing supports a specific domain context.

The operations management environment provides a mechanism to model the capability and the interests of the artifacts. Once the operations management environment tests the proposed operations, by matching the capability and interests, business operation management can push the operations into the appropriate artifacts. The operations also may be referred to as rules. The operations management environment supports a flexible and extensible modeling mechanism to model complex context.

Figure 8:
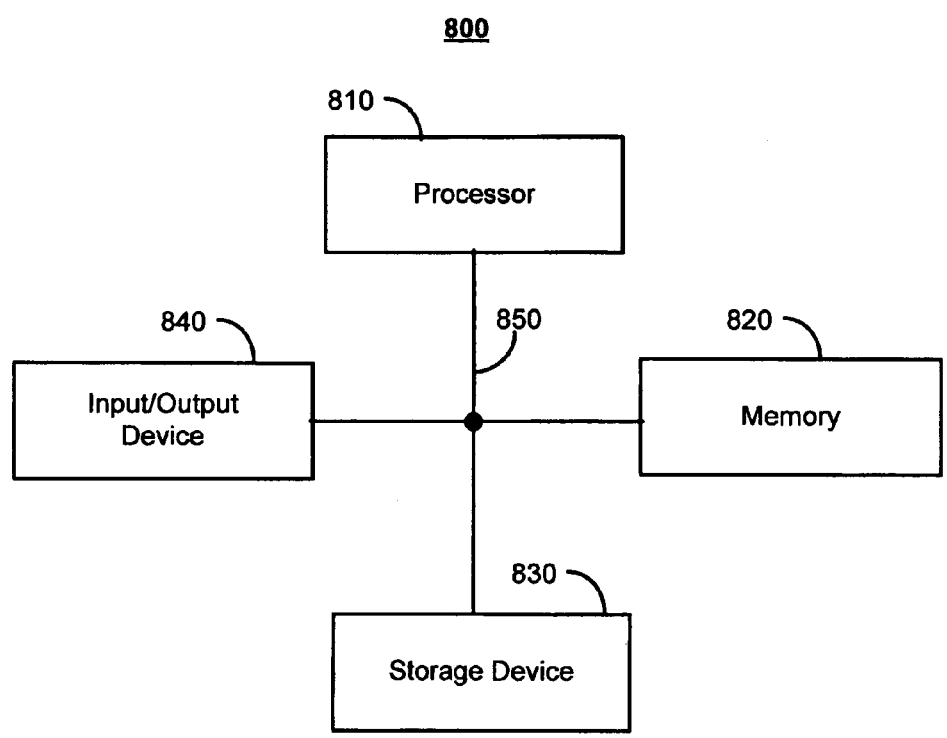
FIG. 8 is a block diagram of a computer system.

FIG. 8 is a block diagram of a computer system 800 that can be used in the operations described above, according to one implementation. The system 800 includes a processor 810, a memory 820, a storage device 830 and an input/output device 840. Each of the components 810, 820, 830, and 840 are interconnected using a system bus 850. The processor 810 is capable of processing instructions for execution within the system 800. In some implementations, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In another implementation, the memory 820 is a volatile memory unit. In still another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

For example, the operations management environment 205 and the modules 206-211, discussed previously with respect to FIG. 2, may include the processor 810 executing computer instructions that are stored in one of memory 820 and storage device 830.

The input/output device 840 provides input/output operations for the system 800. In one implementation, the input/output device 840 includes a keyboard and/or pointing device. In another implementation, the input/output device 840 includes a display unit for displaying graphical user interface as discussed above.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, in computer-readable storage medium, or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of non-destructively updating an information technology infrastructure using an operations management environment, the method comprising:
  coupling an operations management environment with an existing information technology infrastructure through an adaptor, the coupling occurring while the information technology infrastructure is operating to perform one or more tasks related to operation of an enterprise;
  receiving data from the information technology infrastructure through the adapter, the data being generated by activity of existing artifacts included in the information technology infrastructure, the artifacts being configured to perform the one or more tasks;
  in response to receiving data through the adapter, determining relationships between the artifacts included in the information technology infrastructure based on data received through the adapter;
  creating the model of the information technology infrastructure according to determined relationships between the artifacts;
  determining a proposed modification to the information technology infrastructure based on an external change;
  identifying, from among the artifacts included in the information technology infrastructure, artifacts affected by the proposed modification;
  simulating, while the information technology infrastructure performs the one or more tasks, a response of artifacts identified as affected by the proposed modification using the model of the information technology infrastructure;
  monitoring the response of the artifacts to determine if the proposed modification implements the external change;
  generating a modification based on the proposed modification if the proposed modification implements the external change; and
  updating the information technology infrastructure with the modification by pushing the modification through the adaptor while the information technology infrastructure performs the one or more tasks.

2. The method of claim 1, wherein determining the relationships between the artifacts included in the information technology infrastructure comprises:
  triggering events in one or more of the artifacts, the events being associated with at least one context and the events resulting from an activity the artifacts,
  receiving data produced by the event,
  aggregate the data produced by the event based on the at least one context associated with the data, and
  identify relationships between the one or more of the artifacts based on aggregated data produced by the event, the relationships depending on the context.

3. The method of claim 2, wherein the context comprises an interaction between the artifacts and a user that has a defined level of access to the artifacts.

4. The method of claim 1, wherein the artifacts include a process implemented by the information technology infrastructure.

5. The method of claim 1, wherein the artifacts include a sensor.

6. The method of claim 1, wherein the modification is a change to one or more existing tasks performed by the information technology infrastructure.

7. The method of claim 1, wherein the modification is a new task.

8. The method of claim 1, wherein identifying artifacts affected by the proposed modification comprises determining capabilities of the artifacts included in the information technology infrastructure.

9. The method of claim 1, wherein updating the information technology infrastructure with the modification by pushing the modification through the adaptor comprises pushing the modification only to artifacts identified as affected by the proposed modification.

10. The method of claim 1, wherein the external change comprises a change in the operations of an enterprise associated with the information technology infrastructure.

11. A system for non-destructively updating an information technology infrastructure, the system comprising:
  an adaptor configured to be coupled to an existing information technology infrastructure while the information technology infrastructure is operating to perform one or more tasks related to operation of an enterprise, and to exchange data with the information technology infrastructure;
  an event module configured to:
    trigger an occurrence in the information technology infrastructure, the occurrence being performed by existing artifacts included in the information technology infrastructure, the occurrence creating data, and the occurrence being associated with at least one context, and
    aggregate the data created by the occurrence based on the at least one context to provide aggregated data, the data being received through the adaptor;
  a modeling module configured to:
    determine relationships between the artifacts included in the information technology infrastructure based on the aggregated data that comprises data received through the adapter; and
    create a model of the information technology infrastructure according to determined relationships between the artifacts;
  a simulator module configured to:
    generate data and a data flow based on a proposed modification to the information technology infrastructure, the proposed modification based on an external change;
    identify, among the artifacts included in the information technology infrastructure artifacts affected by the proposed modification; and
    simulate a response of artifacts identified as affected by the proposed modification using the model of the information technology infrastructure and generated data while the information technology infrastructure continues to perform tasks; and
  an interface module configured to:
    output the model of the information technology infrastructure, and receive input related to the proposed modification and the model of the information technology infrastructure.

12. The system of claim 11, wherein the at least one context comprises an interaction between the artifacts and a user that has a defined level of access to the artifacts.

13. The system of claim 11 further comprising an event repository configured to store the aggregated data.

14. The system of claim 13, wherein the interface module is further configured to output data from the event repository.

15. A computer program product, tangibly embodied in a non-transitory machine-readable medium, the computer program product comprising instructions that, when read by a machine, operate to cause a data processing apparatus to:
  receive, through an adaptor coupled to an existing information technology infrastructure data generated by activity of existing artifacts included in the information technology infrastructure, and the artifacts being configured to perform one or more tasks related to operation of an enterprise, the adaptor communicating with the information technology infrastructure while the information technology infrastructure is operating to perform the one or more tasks;
  determine relationships between the artifacts included in the information technology infrastructure based on data received through the adapter;
  create a model of the information technology infrastructure according to determined relationships between the artifacts;
  determine a proposed modification to the information technology infrastructure based on an external change;
  identify, from among the artifacts of the information technology infrastructure, artifacts affected by the proposed modifications;
  simulate, while the information technology infrastructure performs the one or more tasks, a response of artifacts identified as affected by the proposed modification using the model of the information technology infrastructure;
  monitor the response of the artifacts to determine if the proposed modification implements the external change;
  generate a modification based on the proposed modification if the proposed modification implements the external change; and
  update the information technology infrastructure with the modification by pushing the modification to the information technology infrastructure while the information technology infrastructure performs the one or more tasks.

16. The computer program product of claim 15, wherein to determine the relationships between the artifacts included in the information technology infrastructure, the computer program product includes instructions to cause the data processing apparatus to:
  trigger events in one or more of the artifacts, the events being associated with at least one context and the events resulting from an activity the artifacts,
  receive data produced by the event,
  aggregate the data produced by the event based on the at least one context associated with the data, and
  identify relationships between the one or more of the artifacts based on aggregated data produced by the event, the relationships depending on the context.

17. The computer program product of claim 16, wherein the context comprises an interaction between the artifacts and a user that has a defined level of access to the artifacts.

18. The computer program product of claim 15, wherein to update the information technology infrastructure with the modification by pushing the modification through the adaptor, the modification is pushed only to artifacts identified as affected by the proposed modification.

* * * * *